(12) United States Patent
Zielke et al.

(10) Patent No.: US 8,587,521 B2
(45) Date of Patent: Nov. 19, 2013

(54) SCROLLING INERTIA

(75) Inventors: Terry Lynn Zielke, Loveland, CO (US); Derek W. Hanson, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 439 days.

(21) Appl. No.: 12/847,258

(22) Filed: Jul. 30, 2010

(65) Prior Publication Data

US 2012/0026090 A1 Feb. 2, 2012

(51) Int. Cl.
*G06F 3/033* (2013.01)

(52) U.S. Cl.
USPC ............ 345/163; 345/159; 345/684; 715/856

(58) Field of Classification Search
USPC ........... 345/156, 159, 163, 684, 785; 715/856
See application file for complete search history.

(56) References Cited

U.S. PATENT DOCUMENTS

| | | | | |
|---|---|---|---|---|
| 5,530,455 A * | 6/1996 | Gillick et al. | ................ | 345/163 |
| 6,714,221 B1 * | 3/2004 | Christie et al. | ................ | 715/784 |
| 7,277,084 B2 | 10/2007 | Hinckley et al. | | |
| 7,312,785 B2 | 12/2007 | Tsuk et al. | | |
| 7,629,961 B2 | 12/2009 | Casebolt et al. | | |
| 7,665,034 B2 | 2/2010 | Levi Montalcini | | |
| 2004/0189600 A1 * | 9/2004 | Hinckley et al. | ............. | 345/156 |
| 2007/0209017 A1 | 9/2007 | Gupta et al. | | |
| 2008/0082939 A1 | 4/2008 | Nash et al. | | |
| 2009/0079693 A1 | 3/2009 | Monney et al. | | |
| 2010/0039394 A1 | 2/2010 | Moussavi | | |
| 2011/0187645 A1 * | 8/2011 | Lin | ............................. | 345/163 |

OTHER PUBLICATIONS

Logitech Launches Air Mouse, http://savasplace.com/logitech-launches-air-mouse.

* cited by examiner

*Primary Examiner* — Koosha Sharifi-Tafreshi

(57) ABSTRACT

A computer mouse notifies a mouse driver whenever a scroll event occurs as a result of rotation of a scroll wheel. In response to receiving a notification of a scroll event, the mouse driver adjusts a stored value that represents inertia calculated based on elapsed time between scroll events. The computer scrolls a number of lines on a display, the number being based on the stored value. When the stored value does not represent zero inertia and upon a predetermined amount of time elapsing without occurrence of a scroll event, the computer scrolls a second number of lines on the display. The second number is based on the stored value. The mouse driver adjusts the stored value so as to represent a decrease in inertia.

21 Claims, 6 Drawing Sheets

SCROLLING INERTIA

BACKGROUND

A computer mouse is often used as an input device for a computer. A computer mouse often includes a scroll wheel used to scroll content within a selected document, window or other entity displayed on a display device. Typically the scroll wheel contains a number of notches that provide tactile feedback to a user when the scroll wheel is rotated. A control screen for the computer mouse typically allows a user to select a number of lines scrolled per notch. A special mode may allow a user to scroll a page per notch.

While the scroll wheel can be a great tool when navigating a document, greater versatility in scrolling can enhance a user's productivity.

DESCRIPTION OF EMBODIMENTS

Versatility of a computer mouse scrolling feature is enhanced by utilizing a value for "inertia" when a user rotates a scroll wheel.

Figure 1:
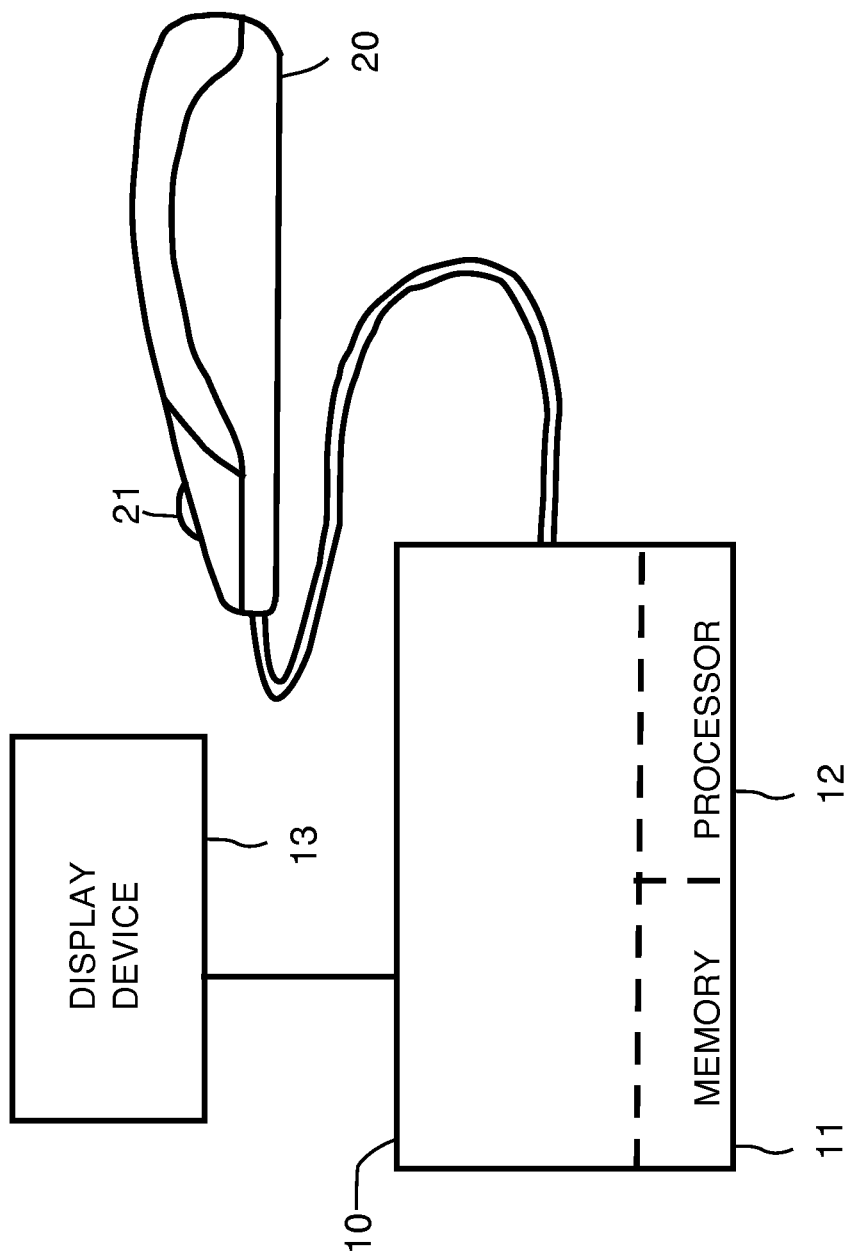
FIG. 1 shows a computer mouse with a scroll wheel connected to a computer.

FIG. 1 shows a mouse 20 with a scroll wheel 21. Mouse 20 is connected via a cable or wirelessly to a computer 10. Computer 10 includes a memory 11 and a processor 12. Computer 10 includes or is connected to a display device 13.

Figure 2:
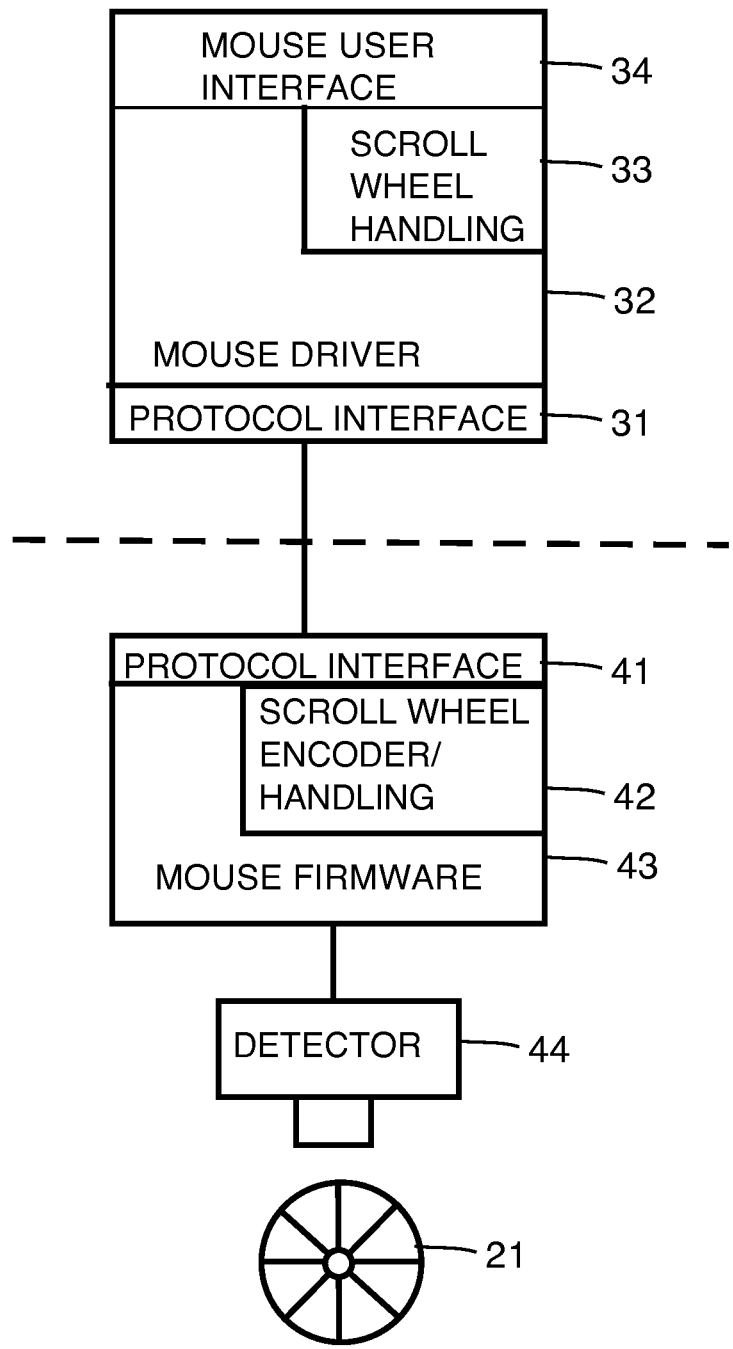
FIG. 2 shows computer software and mouse firmware in accordance with an embodiment of the present invention.

As illustrated by FIG. 2, software within computer 10 includes software for mouse 20 that includes a mouse user interface 34, a mouse driver 32 and a protocol interface 31. For example protocol interface 31 can be a protocol for a wireless network, a USB network or any other network that allows mouse 20 to be connected to computer 10. Mouse driver 32 includes a scroll wheel handling block 33.

Firmware 43 within mouse 20 includes a scroll wheel encoder handling block 42 and a protocol interface 41. For example protocol interface 41 is a protocol for a wireless network, a USB network, a PS 2 interface or any other network that allows mouse 20 to be connected to computer 10.

A detector 44 detects rotation of a scroll wheel 21. For example, detector 44 is an optical detector that detects both direction and distance for rotation of scroll wheel. For example, based on information from detector 44, scroll wheel encoder/handling 42 signals scroll wheel handling block 33 within mouse driver 32 that a scroll event has occurred whenever detector 44 detects a notch of scroll wheel 21 has passed detector 44. Reporting for the scroll event includes an indication of which direction scroll wheel 21 has been rotated. The indication can either be a direct indication of the direction, or merely a signal whenever direction has changed vis-à-vis a last scroll event.

Figure 3:
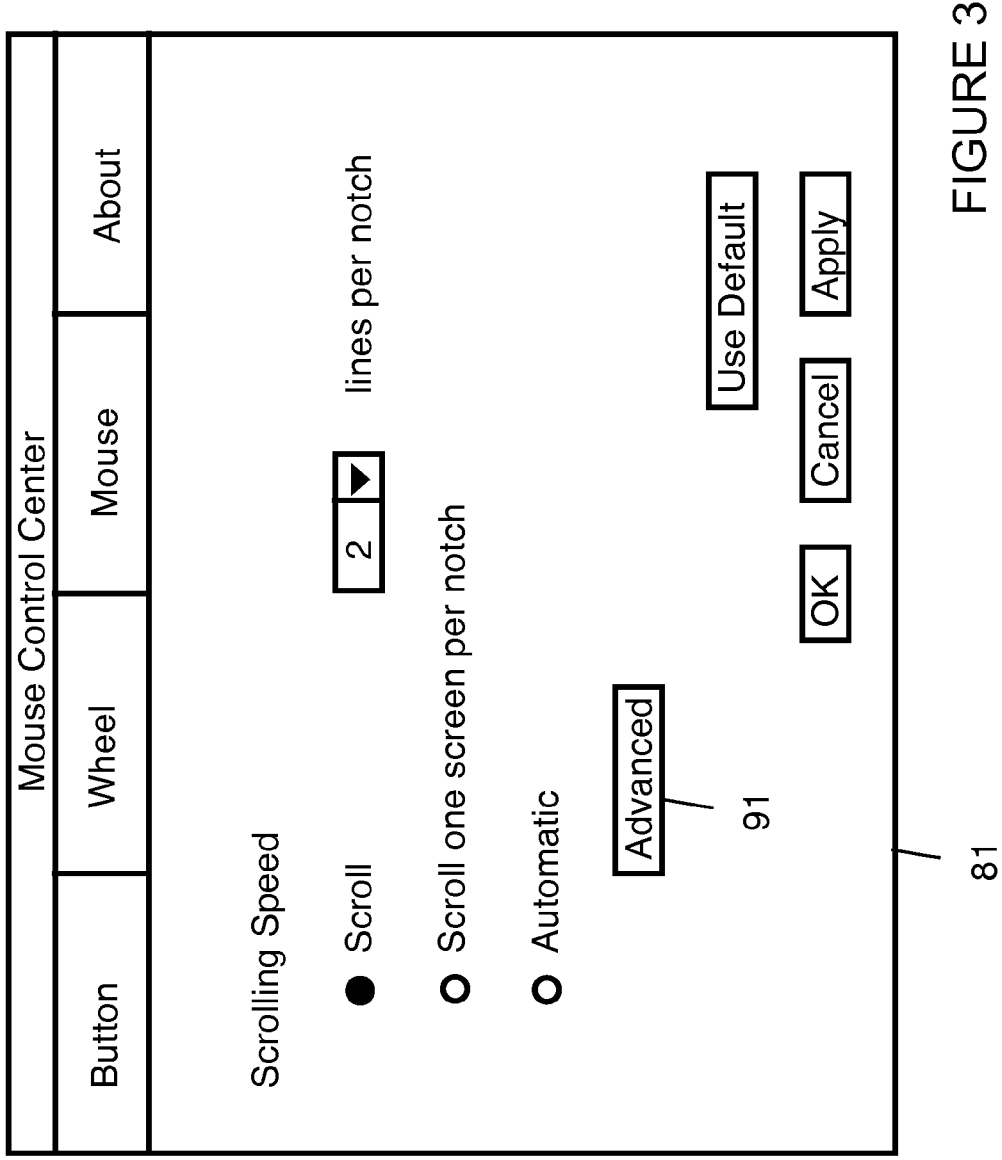
FIG. 3 shows a mouse control center screen for a computer mouse with enhanced operation of a scroll wheel in accordance with an embodiment of the present invention.
Figure 4:
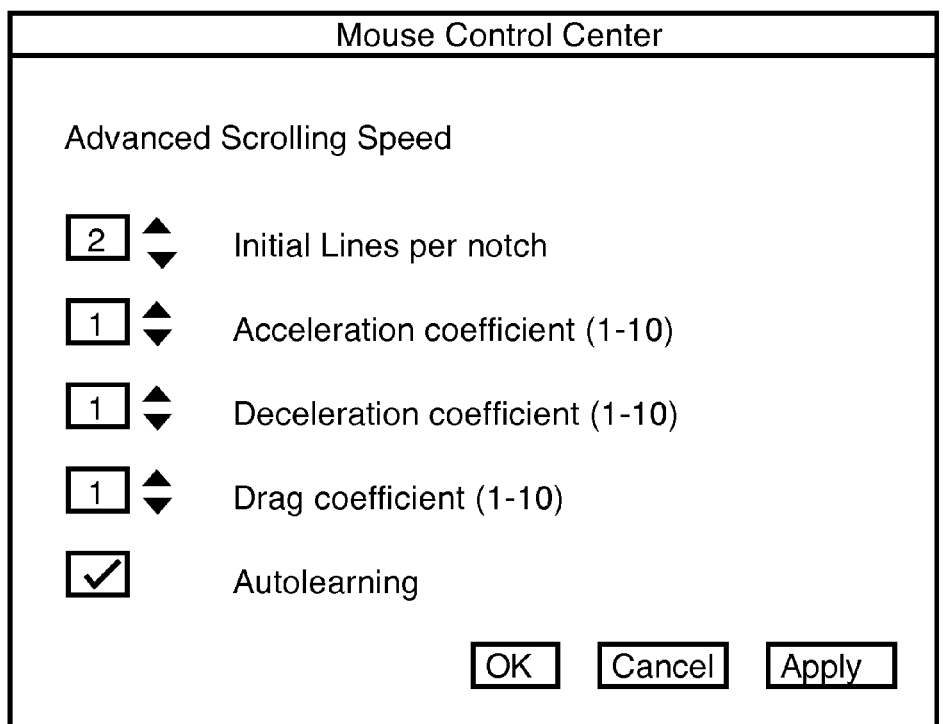
FIG. 4 shows another mouse control center screen for a computer mouse with enhanced operation of a scroll wheel in accordance with an embodiment of the present invention.

FIG. 3 shows a control panel 81. Using control panel 81, the user can select a number of lines per notch that will be scrolled. The user can alternatively select that for each notch selected a screen will be scrolled. The user can also alternatively select that scrolling speed be automatically adjusted. If an advanced button 91 is selected an advanced scrolling speed control panel 82, shown in FIG. 4, is displayed.

Advanced scrolling speed control panel 82 allows adjustment of the parameters for the inertia scrolling mode. A user can select an initial value for lines that are scrolled per notch that scroll wheel 21 is rotated. An acceleration coefficient controls how quickly scrolling and inertia is increased as the user accelerates the rotation speed of scroll wheel 21. A deceleration coefficient controls how quickly scrolling and inertia is decreased as the user decelerates the rotation speed of scroll wheel 21. A drag coefficient controls how quickly scrolling and inertia is decreased when scroll wheel 21 is stopped. When scroll wheel 21 is not rotating and inertia is non-zero, a coasting state is entered in which screen scrolling continues at a rate determined by the remaining amount of inertia. The coasting state is entered when inertia is non-zero and a scroll event has not been detected for a predetermined amount of time indicating the user has stopped rotating scroll wheel 21. The coasting state ends when inertia is zero or when the user resumes rotating scroll wheel 21. An autolearning option, if selected, allows the parameters listed in advanced scrolling speed control panel 82 to be automatically adjusted based on detected user experience.

If a user chooses not to use advance scrolling control panel to modify parameters for the inertial scrolling mode, the parameters are automatically chosen to be default values, for example, when the user selects "Automatic" as the scrolling speed in control panel 81.

Figure 5:
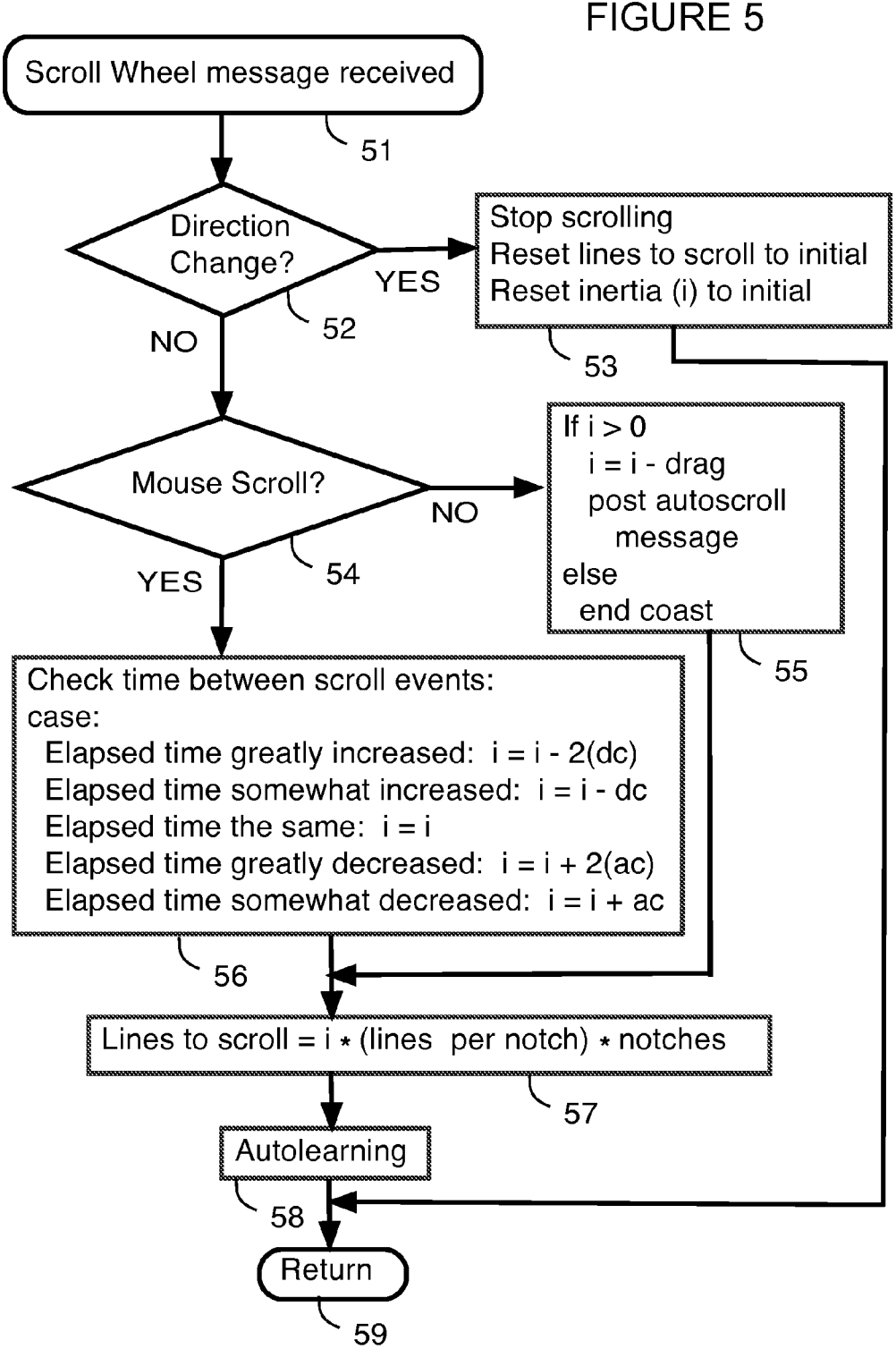
FIG. 5 is a flowchart describing enhanced operation of a scroll wheel of a computer mouse in accordance with an embodiment of the present invention.

FIG. 5 is a flowchart showing activity of scroll wheel handling block 33 when scroll wheel handling block 33 receives a scroll wheel message because a scroll event has been generated from scroll wheel encoder/handling 42 or receives a scroll wheel message because a coasting state has been entered. Scroll wheel handling block 33 adjusts scrolling speed based on inertia resulting from rotation of scroll wheel 21 and takes into account parameters for the scrolling mode that can be user selected using advanced scrolling speed control panel 82 shown in FIG. 4.

In a block 51, a scroll wheel message is received indicating either scroll wheel encoder/handling 42 has signaled that a scroll event has been detected by detector 44 or indicating that a scroll message has been posted because scrolling is in the coasting state. For example, scroll wheel encoder/handling 42 indicates a scroll event has been detected whenever detector 44 detects scroll wheel 21 rotates in either direction so that a notch is crossed.

In a block 52, a check is made to see if there has been a direction change in rotation of scrolling wheel 21 since the last scroll message was received. If so, in a block 53, scrolling is stopped. A value for "lines to scroll" is reset to the initial lines per notch selectable using advanced scrolling speed control panel 82 shown in FIG. 4. A value for inertia (i) is reset to an initial value which represents zero inertia. Then, in a block 59, scroll wheel handling block 33 returns.

If in block 52 there has been no direction change in rotation of scrolling wheel 21, in a block 54 a check is made to see if scroll wheel encoder/handling 42 has indicated a scroll event has been detected by detector 44. If so, in a block 56, a current value for inertia is calculated. For example, this is done based on comparing the amount of elapsed time between the reporting of scroll events.

If the elapsed time between scroll events is greatly increasing, the value for inertia (i) is decreased by twice the deceleration coefficient (dc) selectable using advanced scrolling speed control panel 82 shown in FIG. 4. For example, "greatly increasing" means that the elapsed time between scroll events has increased by 50% or more from a previously calculated average elapsed time between scroll events. For example, the averaged elapsed time may be calculated based on ten previous scroll events.

If the elapsed time between scroll events is increasing but failed to reach the threshold for "greatly increasing", the value for inertia (i) is decreased by the deceleration coefficient (dc).

If the elapsed time between scroll events is neither increasing nor decreasing, the inertial value (i) is unchanged.

If the elapsed time between scroll events is greatly decreasing, the value for inertia (i) is increased by twice the acceleration coefficient (ac) selectable using advanced scrolling speed control panel 82 shown in FIG. 4. For example, "greatly decreasing" means that the elapsed time between scroll events has decreased by 50% or more from a previously calculated average elapsed time between scroll events. For example, the averaged elapsed time may be calculated based on ten previous scroll events.

If the elapsed time between scroll events is decreasing but failed to reach the threshold for "greatly decreasing", the value for inertia (i) is increased by the acceleration coefficient (ac).

If in block 54 scroll wheel encoder/handling 42 has not indicated a scroll event has been detected by detector 44, this means that the scroll message has been posted because scrolling is in the coasting state. As a result block 55 is entered. In block 55, if the value for inertia (i) is greater than zero inertia, the value for inertia (i) is decreased by the drag coefficient (drag) selectable using advanced scrolling speed control panel 82 shown in FIG. 4, or otherwise chosen automatically when a user selects "Automatic" for scrolling speed in control panel 81. An autoscroll message is posted which means that scrolling will continue in the coasting state. When the value for inertia (i) is equal to zero, the coasting state is exited.

In a block 57, the amount of lines to scroll is calculated by multiplying the value for inertia (i) and the initial value for lines that are scrolled per notch selectable using advanced scrolling speed control panel 82 shown in FIG. 4, or otherwise chosen automatically when a user selects "Automatic" for scrolling speed in control panel 81.

In a block 58, autolearning can be performed that automatically adjusts parameters that impact scrolling. In block 59, pass through scroll wheel handling block 33 returns.

Figure 6:
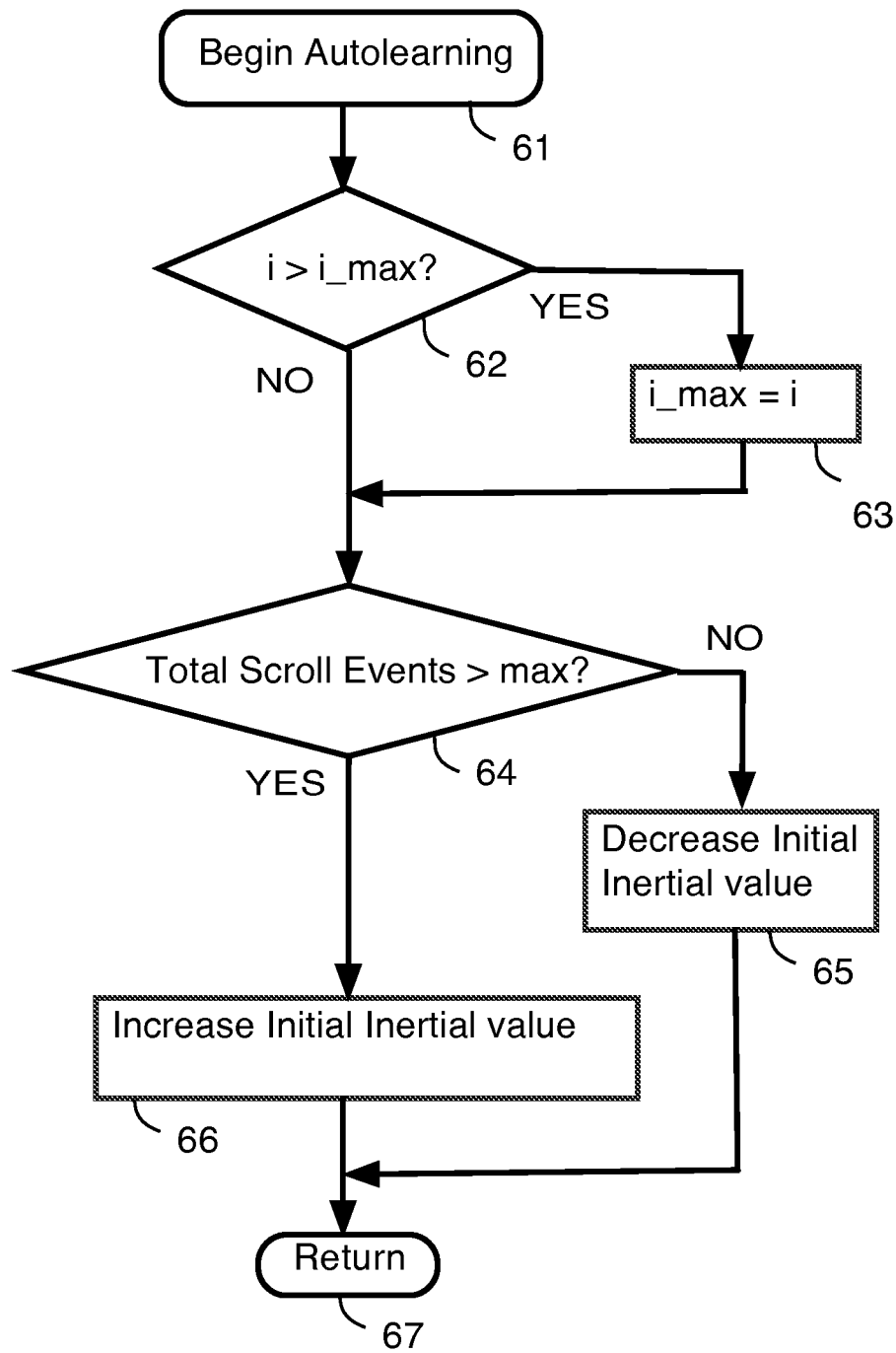
FIG. 6 is a flowchart describing autolearning within enhanced operation of a scroll wheel of a computer mouse in accordance with an embodiment of the present invention.

FIG. 6 is a flowchart showing an example implementation of autolearning represented in FIG. 5 by block 58. In a block 61, if activated, autolearning begins. In a block 62 a check is made to see if the value for inertia (i) is greater than a maximum value for inertia (i_max). If so, in a block 63 a maximum value for inertia (i_max) is increased to equal the current value for inertia (i).

In a block 64, a check is made to see if a total number of scroll events has exceeded a maximum value. If so, in a block 66, the initial value for lines that are scrolled per notch selectable using advanced scrolling speed control panel 82 shown in FIG. 4 is increased. If in block 64 the total number of scroll events has not exceeded a maximum value, in a block 65, the initial value for lines that are scrolled per notch is decreased. In a block 67, the autolearning is complete.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

We claim:

1. A method for scrolling through a display comprising:
   detecting elapsed time between each of a plurality of scroll events resulting from a user turning a scroll wheel;
   upon detecting each scroll event in the plurality of scroll events, performing the following:
      adjusting a stored value that represents inertia calculated based on elapsed time between scroll events, and
      scrolling a number of lines, the number being based on the stored value; and,
   when the stored value does not represent zero inertia and upon a predetermined amount of time elapsing without occurrence of a scroll event, performing the following:
      scrolling a second number of lines, the second number being based on the stored value, and
      adjusting the stored value so as to represent a decrease in inertia, wherein adjusting the stored value based on elapsed time between scroll events comprises:
   adjusting the stored value to indicate an increase of inertia when elapsed time between scroll events is decreasing; and
   adjusting the stored value to indicate a decrease in inertia when the elapsed time between scroll events is increasing.

2. A method as in claim 1 wherein adjusting the stored value based on elapsed time between scroll events comprises:
   increasing the stored value by two times an acceleration coefficient when elapsed time between scroll events decreases at least a predetermined amount of time;
   increasing the stored value by the acceleration coefficient when elapsed time between scroll events decreases less than the predetermined amount of time;
   decreasing the stored value by two times a deceleration coefficient when elapsed time between scroll events increases at least a second predetermined amount of time; and
   decreasing the stored value by the deceleration coefficient when elapsed time between scroll events increases less than the second predetermined amount of time.

3. A method as in claim 2 wherein adjusting the stored value to indicate a decrease in inertia comprises:
   decreasing the stored value by a drag coefficient.

4. A method as in claim 1 wherein adjusting the stored value to indicate a decrease in inertia comprises:
   decreasing the stored value by a drag coefficient.

5. A method as in claim 1 additionally comprising:
   storing a maximum value for the stored value.

6. A method as in claim 1 additionally comprising:
   increasing an initial value for the stored value when a predetermined number of scroll events are detected.

7. An input system comprising:
   a computer mouse including a scroll wheel; and,
   a mouse driver for the computer mouse, the mouse driver residing on a computer;
   wherein the computer mouse notifies the mouse driver whenever a scroll event occurs as a result of rotation of the scroll wheel;
   wherein in response to receiving a notification of a scroll event, the mouse driver adjusts a stored value that represents inertia calculated based on elapsed time between scroll events and the computer scrolls a number of lines on a display, the number being based on the stored value;

wherein when the stored value does not represent zero inertia and upon a predetermined amount of time elapsing without occurrence of a scroll event, the computer scrolls a second number of lines on the display, the second number being based on the stored value, and the mouse driver adjusts the stored value so as to represent a decrease in inertia; and wherein the mouse driver adjusts the stored value based on elapsed time between scroll events by:

adjusting the stored value to indicate an increase of inertia when elapsed time between scroll events is decreasing; and adjusting the stored value to indicate a decrease in inertia when the elapsed time between scroll events is increasing.

8. An input system as in claim 7 wherein the mouse driver adjusts the stored value based on elapsed time between scroll events by:

increasing the stored value by two times an acceleration coefficient when elapsed time between scroll events decreases at least a predetermined amount of time;

increasing the stored value by the acceleration coefficient when elapsed time between scroll events decreases less than the predetermined amount of time;

decreasing the stored value by two times a deceleration coefficient when elapsed time between scroll events increases at least a second predetermined amount of time; and decreasing the stored value by the deceleration coefficient when elapsed time between scroll events increases less than the second predetermined amount of time.

9. An input system as in claim 8 wherein the mouse driver adjusts the stored value so as to represent a decrease in inertia by decreasing the stored value by a drag coefficient.

10. An input system as in claim 7 wherein the mouse driver adjusts the stored value so as to represent a decrease in inertia by decreasing the stored value by a drag coefficient.

11. An input system as in claim 7 wherein the mouse driver stores a maximum value for the stored value.

12. An input system as in claim 7 wherein the mouse driver increases an initial value for the stored value when a predetermined number of scroll events are detected.

13. A mouse driver residing on a computer, the mouse driver comprising:

a scroll wheel handling block, the scroll wheel handling block in response to receiving notification of a scroll event occurs as a result of rotation of a scroll wheel on a computer mouse, adjusting a stored value that represents inertia calculated based on elapsed time between scroll events;

wherein the computer scrolls a number of lines on a display, the number being based on the stored value; and, wherein when the stored value does not represent zero inertia and upon a predetermined amount of time elapsing without occurrence of a scroll event, the computer scrolls a second number of lines on the display, the second number being based on the stored value, and the scroll wheel handling block adjusts the stored value so as to represent a decrease in inertia, wherein the scroll wheel handling block adjusts the stored value based on elapsed time between scroll events by:

adjusting the stored value to indicate an increase of inertia when elapsed time between scroll events is decreasing; and adjusting the stored value to indicate a decrease in inertia when the elapsed time between scroll events is increasing.

14. A mouse driver as in claim 13 wherein the scroll wheel handling block adjusts the stored value based on elapsed time between scroll events by:

increasing the stored value by two times an acceleration coefficient when elapsed time between scroll events decreases at least a predetermined amount of time;

increasing the stored value by the acceleration coefficient when elapsed time between scroll events decreases less than the predetermined amount of time;

decreasing the stored value by two times a deceleration coefficient when elapsed time between scroll events increases at least a second predetermined amount of time; and decreasing the stored value by the deceleration coefficient when elapsed time between scroll events increases less than the second predetermined amount of time.

15. A mouse driver as in claim 14 wherein the scroll wheel handling block adjusts the stored value so as to represent a decrease in inertia by decreasing the stored value by a drag coefficient.

16. A mouse driver as in claim 14 wherein the scroll wheel handling block stores a maximum value for the stored value.

17. A mouse driver as in claim 14 wherein the scroll wheel handling block increases an initial value for the stored value when a predetermined number of scroll events are detected.

18. The method of claim 1, wherein the second number of lines are scrolled during a coasting state.

19. The method of claim 1, wherein the scrolling of the second number of lines is initiated prior to detection of an additional scroll event following the scrolling of the number of lines.

20. The input system of claim 7, wherein the second number of lines are scrolled during a coasting state of the input system.

21. The mouse driver of claim 13, wherein the second number of lines are scrolled during a coasting state of the mouse driver.

* * * * *

UNITED STATES PATENT AND TRADEMARK OFFICE
CERTIFICATE OF CORRECTION

PATENT NO. : 8,587,521 B2  
APPLICATION NO. : 12/847258  
DATED : November 19, 2013  
INVENTOR(S) : Terry Lynn Zielke et al.

It is certified that error appears in the above-identified patent and that said Letters Patent is hereby corrected as shown below:

In the Specification

In column 2, line 11, below "shown in FIG. 4, is displayed."
insert -- Advanced scrolling speed control panel 82 allows modification of parameters for an inertia scrolling mode that takes into account scrolling inertia. What is meant by "scrolling inertia" also referred to herein as "inertia", is the tendency to continue scrolling through lines of display even after a user has stopped rotating scrolling wheel 21. Inertia is increased through acceleration of rotation of scroll wheel 21. Inertia is decreased through deceleration of rotation of scroll wheel 21 and over time in accordance with a drag coefficient. --.

Signed and Sealed this
First Day of April, 2014

Michelle K. Lee
*Deputy Director of the United States Patent and Trademark Office*